United States Patent Office 3,658,730
Patented Apr. 25, 1972

3,658,730
GAS PRODUCING COMPOSITIONS CONTAINING AZODICARBONAMIDE
Toshimasa Takahashi and Moriyuki Takaichi, Otsu-shi, Hiroshi Makino, Kusatsu-shi, and Toshikazu Aoki, Otsu-shi, Japan, assignors to Toyo Rayon Company, Ltd., Tokyo, Japan
Filed July 9, 1969, Ser. No. 840,366
Int. Cl. C08f 47/10; C09k 3/00
U.S. Cl. 260—2.5 R     10 Claims

ABSTRACT OF THE DISCLOSURE

Gas producing compositions are provided which contain azodicarbonamide and at least one chromium containing compound such as a chromate, dichromate or chromium alum salt of an alkali or alkaline earth metal or a chromium compound such as chromium trioxide or chromium trichloride. The compositions of this invention decompose at a lower temperature and produce a greater volume of gas than an equivalent amount of azodicarbonamide making the compositions of this invention especially useful as blowing agents in the preparation of foamed thermoplastic resin products.

BACKGROUND OF THE INVENTION

(1) Field of the invention

This invention relates to gas producing compositions. More particularly this invention is concerned with compositions which contain azodicarbonamide and an assistant which causes the azodicarbonamide to decompose at a lower temperature and produce a large volume of gas.

DESCRIPTION OF THE PRIOR ART

Various types of known chemical compounds and compositions decompose on heating to produce relatively large volumes of gases. Certain of these compounds and compositions are employed as blowing agents in the manufacture of foamed thermoplastic resins. One of the more widely used blowing agents is azodicarbonamide because of its excellent stability, high decomposition temperature, fast rate of decomposition and because of the relatively high volume of gas produced per unit weight on decomposition. The gases that are produced by the decomposition of azodicarbonamide are substantially odorless and the decomposition residues are nontoxic, odorless and do not transfer.

When azodicarbonamide is employed as a blowing agent in the manufacture of foamed thermoplastic resins, the optimum decomposition temperature and more particularly the optimum rate of gas evolution will vary depending on both the method of foaming and the particular type of thermoplastic resin that is employed. For example, polyethylene foams are manufactured by one of the following methods when azodicarbonamide is used as the blowing agent.

(a) Radiation cross-linking continuous foaming method: In this method, polyethylene and azodicarbonamide are mixed together and extruded. The extruded material is subjected to irradiation by electron rays to cause cross-linking and is then heated to a temperature sufficient to decompose the azodicarbonamide. The gases produced on decomposition cause the extruded material to expand, producing a foamed sheet of material.

(b) Chemical cross-linking continuous foaming method: In this method, polyethylene, azodicarbonamide and a chemical cross-linking agent are mixed together and extruded. The extruder material is heated to a temperature sufficient to decompose the azodicarbonamide which causes the extruded material to expand into a foamed sheet.

(c) Pressure foaming method: In this method, polyethylene, azodicarbonamide and a chemical cross-linking agent are mixed together by melting, and are then measured into a cavity which is closed off to form a confined chamber. The contents are then heated under pressure. Thereafter, the material is foamed by depressurizing the chamber.

In each of the above methods, the polyethylene is mixed with azodicarbonamide before foaming. The decomposition temperature of azodicarbonamide must be higher than the temperature at which the mixing is conducted because if the azodicarbonamide decomposes during mixing, the final foamed product will contain large bubbles which adversely effect the quality of the final product.

In the foaming step, polyethylene resin is heated to a temperature at which the polyethylene resin obtains a sufficient viscosity and elasticity so that the foam when generated will not collapse. The optimum temperature range for the foaming step is dependent on the grade of polyethylene, the degree of cross-linking and the method of foaming. In any event, the azodicarbonamide blowing agent must decompose at or below the temperature at which foaming is to take place.

As noted above, the optimum decomposition temperature is also dependent on the particular type of thermoplastic resin that is to be foamed. For example, in the manufacture of foamed polyvinyl chloride leathers by either of the spread method using plastisol or the calender method using non-plastisol, the mixing of the resin, plasticizer, stabilizer, the azodicarbonamide blowing agent and any other additives is conducted out at a relatively low temperature and accordingly, there is no substantial danger of the azodicarbonamide decomposing during the mixing step. However, when the mixture is fed through the foaming furnance to cause the mixture to foam as in the spread method or the mixture is fed through a heated inverse L-shaped calender to cause foaming as in the calender method, the foaming temperature must be relatively low in order to maintain the stability of the generated foam and to prevent thermal decomposition of the substrate polyvinyl chloride. Accordingly, when polyvinyl chloride is foamed, the decomposition temperature of azodicarbonamide should be relatively lower than when polyethylene is foamed.

As noted above, when thermoplastic resins are foamed using azodicarbonamide as a blowing agent, the decomposition temperature of the azodicarbonamide is an important factor. The prior art suggested the addition of assistants to control the decomposition temperature of azodicarbonamide. Certain of these assistants which are also referred to as kickers or promotors, are disclosed in R. A. Reed, British Plastics [October], 468 (1960); L. I. Nass, Mod. Plastics, 40 [7], 15 (1963); idem, ibid., 40 [8], 127 (1963); and "Celogen AZ Compounding Research Report No. 38" (Naugatuck Chemicals Div. of U.S. Rubber Co.). The following substances are disclosed in these references:

Cd salt—Cadmium stearate, cadmium laurate, 2-ethyl hexoate cadmium, etc.
Zn salt—Zinc oxide, zinc acetate, zinc chloride, etc.
Pb salt—Lead stearate, lead acetate, lead dibasic stearate, lead dibasic phosphite, lead tribasic sulfate, etc.
Others—Calcium - barium - laurate, cadium - barium composite The assistants suggested in the prior art reduced somewhat the decomposition temperature of azodicarbonamide but also had the highly undesirable effect of tending to substantially decrease the volume of gas produced on the decomposition. Because of the decreased output of gas, additional amounts of the blowing agents had to be employed which both increases the cost and the amount of decomposition residues in the final product.

It is an object of this invention to provide gas producing compositions containing azodicarbonamide which decompose at a predetermined temperature.

It is an additional object of this invention to provide gas producing compositions containing azodicarbonamide having a lower decomposition temperature and which produces at least as great a volume of gas as azodicarbonamide on an equivalent weight basic.

SUMMARY OF THE INVENTION

The objects of this invention have been obtained by providing compositions comprised of azodicarbonamide and at least one chromium containing compound. The composition of this invention decomposes at lower temperatures and quite surprisingly, produces a greater volume of gas on decomposition than azodicarbonamide.

DESCRIPTION OF THE PREFERRED EMBODIMENT

Figure 1:
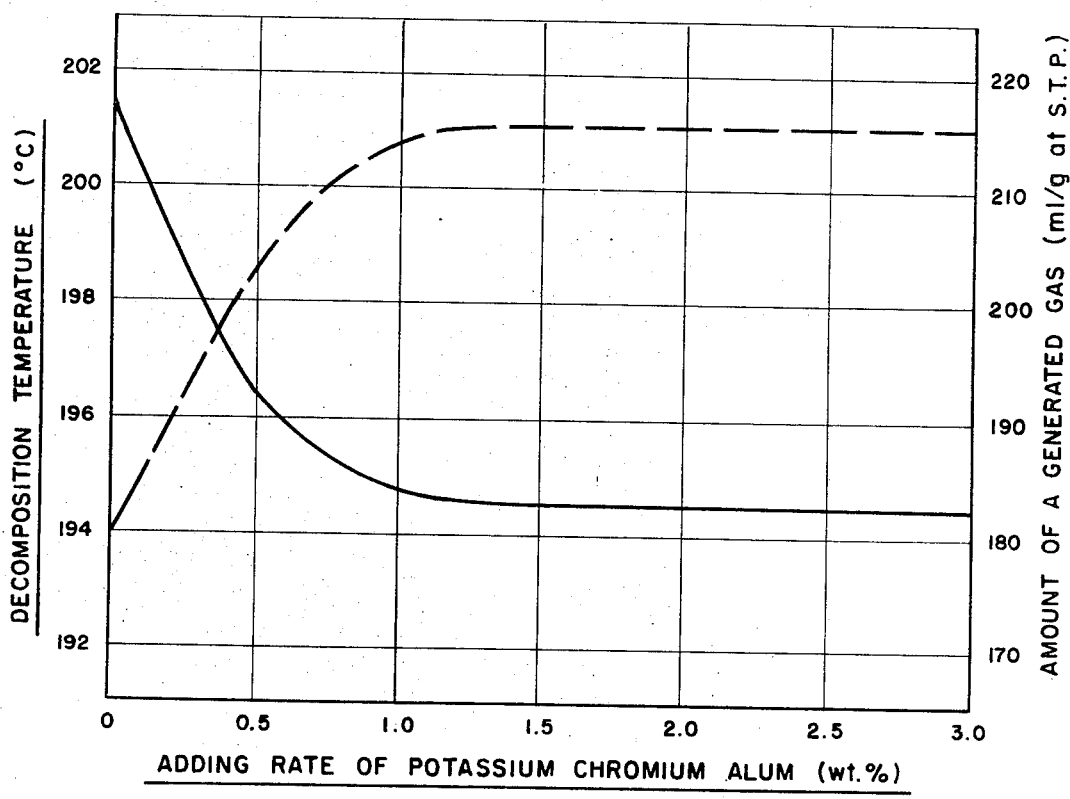
FIG. 1 is a graphic illustration showing the effect on the decomposition temperature (broken line) and the amount of gas generated (solid line) on decomposition of azodicarbonamide obtained by varying the amount of potassium chromium alum.

The gas producing compositions of this invention are comprised of azodicarbonamide and at least one chromium containing compound. The chromium compounds which are advantageously employed in this invention are chromate, dichromate, chromium alum salts of the alkali metals, alkaline earth metals and divalent metals such as copper, tin or lead, chromium trioxide and chromium trichloride, and are represented by the formulae $$M_2SO_4Cr_2(SO_4)_3$$
$$M_2Cr_2O_7$$
$$M'Cr_2O_7$$
$$M_2CrO_4$$
$$M'CrO_4$$
$$CrO_3$$
$$CrCl_3$$

wherein M stands for a monovalent cation and M' stands for a divalent cation.

As a monovalent cation represented by M in the above formulae, particular attention is directed to the alkali metal such as lithium, sodium, potassium and rubidium and also to ammonium. As a divalent cation represented by M' in the above formulae, particular attention is directed to calcium, magnesium, barium and strontium and other divalent metals such as copper, tin and lead.

The chromium compounds included within the above formulae, which are particularly useful in this invention are lithium-chromium alum, sodium-chromium alum, potassium-chromium alum, rubidium-chromium alum, ammonium-chromium alum; lithium bichromate, sodium bichromate, potassium bichromate, rubidium bichromate, ammonium bichromate, copper bichromate, magnesium bichromate, calcium bichromate, strontium bichromate, barium bichromate, tin bichromate, lead bichromate; lithium chromate, sodium chromate, potassium chromate, rubidium chromate, ammonium chromate, copper chromate, magnesium chromate, calcium chromate, strontium chromate, barium chromate, tin chromate, lead chromate; chromium trioxide and chromium trichloride.

In preparing the composition of this invention, a single chromium containing compound can be employed or a combination of two or more compounds can be employed with equally satisfactory results.

Of the aforementioned compounds, chromium trioxide and those compounds in which M in the formulae is Na, K or $NH_4$ are relatively inexpensively and commercially available and are therefore the preferred compounds for employment in this invention.

When the above disclosed sodium salts are employed in the compositions of this invention, special precautions should be taken to prevent the compositions from picking up water since the sodium salts are highly hydroscopic and the water of hydration may cause large bubbles in the final product. It is preferable to keep all the compositions of this invention in a dry state until they are added to the thermoplastic resin mixture to be foamed. Some of the chromium containing compounds have water of crystallization in their normal state, however, the water of crystallization does not interfere with the application of the present invention.

Even relatively small amounts of the above described chromium compounds when added to azodicarbonamide will have some effect on the decomposition temperature and increase the amount of gas produced. However, in order to obtain a practical effect, at least 0.05% of the chromium containing compounds based on the weight of the azodicarbonamide should be employed. There is no exact upper limit to the amount of chromium compounds, however, amounts in excess of 10%, of the chromium containing compounds based on the weight of the azodicarbonamide do not have any substantial addition effect on either the decomposition temperature or amount of gas generated on decomposition. It is preferable to employ about 0.2% to 1.5% by weight of the chromium compounds based on the weight of the azodicarbonamide, since in this addition range the chromium containing compounds are most effective in lowering the decomposition temperature and increasing the amount of gas generated. Amounts of the chromium compounds in excess of 10% should be avoided in that this reduces the relative amount of the azodicarbonamide in the compositions. Since large excess of the chromium compounds do not either decrease the decomposition temperature or increase the volume of gas, the excess has the effect of diluting the composition so that less gas is produced per unit weight of the composition.

The compositions of this invention are obtained by blending the chromium containing compounds either by a dry method or a wet method with the azodicarbonamide. In the dry method the chromium containing compound is pulverized, thereafter dry mixed with the azodicarbonamide. In order to obtain a more uniform mixture, an aqueous solution of said chromium containing compound can be added to the azodicarbonamide and the mixture thoroughly blended and then dried. It is also possible to add the pulverized chromium containing compound directly to the thermoplastic resin when it is mixed with azodicarbonamide. Because chromium containing compounds must contact with particles of azodicarbonamide in order to be effective, smaller particle sizes are desirable.

The advantages of the compositions of this invention in comparison with the compositions of the prior art are as follows:

(a) By adding the chromium containing compounds, the compositions of the present invention, the amount of generated gas per unit of weight is to be remarkably increased. This enables the user to employ less blowing agents. The increase in the amount of a generated gas was not obtained with the prior art compositions.

(b) The decomposition temperature of azodicarbonamide is remarkably lowered. Moreover, by varying the amount of the chromium compounds, both the decomposition temperature and the amount of a generated gas can be controlled with certain limits.

The following examples are given by way of illustration and are not intended to limit the scope of the subjoined claims. The parts are given in parts by weight unless otherwise indicated.

EXAMPLE 1

Various substances including certain known decomposition assistants and certain of the chromium containing assistants of this invention were separately pulverized in a mortar. The amount of 0.5% by weight of each of the pulverized assistants was added to commercially available azodicarbonamide of 99.0% purity having a particle size below 15 microns. The decomposition temperature and the amount of gas generated on decomposition of each of the mixtures were measured.

The decomposition temperature of the compositions were measured according to JIS 0064—1966 (standard method of measuring a melting point of a chemical product.) The decomposition temperature of azodicarbonamide was assumed to be 200° C. and a liquid inside a measuring pipe was raised to 170° C. A capillary tube containing the sample to be evaluated was immersed in the liquid and the temperature was raised at a rate of 3° C./min. until 180° C. When the temperature reached 180° C., the temperature was raised at a rate of 2° C./min. The temperature at which color of the sample changed to white or decomposed and foamed was taken as the decomposition temperature.

The amount of a generated gas was measured according to ASTM D1715–60T. (Gas evolved from chemical blowing agents for cellular plastics.) Into a 12 mm. x 180 mm. glass test tube 2.50 ml. of liquid paraffin was charged, to which 0.250 g. of the sample to be evaluated was added. The test tube was immersed in a heated bath kept at 190° C. and a generated gas was collected in a 100 ml. glass burette. The apparent amount of gas generated 20 minutes after the immersion was measured. Similarly, a blank test was carried out to measure the apparent amount of a generated gas due to expansion of air, etc. The amount of a generated gas was converted to a standard state (0° C., 1 atm.) by the following equation and the amount of a generated gas per g. was reported.

$$V = \frac{(V_a - V_0) \times \frac{P_0}{760} \times \frac{273}{273+T}}{W}$$

V: Amount of a generated gas (converted to 0° C./atm.) (ml./g.)
$V_a$: Apparent amount of a generated gas (ml.)
$V_0$: Expanded amount of air, etc. (ml.)
$P_0$: Atmospheric pressure converted to 0° C. (mm. Hg)
T: Water temperature of a cooling jacket which surrounds a gas burette
W: Weight of the sample (=0.250 g.)

$P_0$ was obtained by measuring atmospheric pressure at the time of measuring using Fortin's mercury barometer and thereafter carrying out temperature correction, capillary correction and latitude correction. The results are shown in Table 1.

As compared with the sample of azodicarbonamide, the compositions comprised of azodicarbonamide and a chromium containing compound such as chromium alum, bichromate or chromate salts, chromium trioxide or chromium trichloride had substantially lowered temperatures and the amount of a generated gas was also surprisingly increased by about 5% to 20%.

Of the hitherto known decomposition assistants lowered the decomposition temperature more than the chromium containing compound but the amount of a generated gas remained the same or decreased.

TABLE 1.—ADDING EFFECTS OF VARIOUS SUBSTANCES IN AN AMOUNT OF 0.5% BY WEIGHT OF THE AZODICARBONAMIDE.

| Additive | Decomposition temperature (° C.) | | Amount of a generated gas (ml./g. at STP) | |
|---|---|---|---|---|
| Blank | 201.1 | 201.5 | 177.7 | 183.7 |
| Blowing assistants of the present invention: | | | | |
| Chromium alum: | | | | |
| Sodium-chromium alum | 194.9 | | 197.8 | |
| Potassium-chromium alum | 196.0 | 196.2 | 195.2 | 205.8 |
| Ammonium-chromium alum | 195.6 | 196.2 | 201.5 | |
| Bichromate: | | | | |
| Sodium bichromate | 193.1 | | 210.1 | |
| Potassium bichromate | 192.1 | 188.4 | 214.7 | |
| Ammonium bichromate | 194.5 | | 205.2 | |
| Calcium bichromate | 195.8 | | 201.5 | |
| Barium bichromate | 194.9 | | 200.0 | |
| Lead bichromate | 196.1 | | 205.1 | |
| Chromate: | | | | |
| Sodium chromate | 194.1 | | 203.8 | |
| Potassium chromate | 191.3 | 193.9 | 201.2 | |
| Ammonium chromate | 195.0 | | 204.3 | |
| Calcium chromate | 196.3 | | 191.8 | |
| Barium chromate | 192.7 | | 192.4 | |
| Lead chromate | 194.6 | | 195.0 | |
| Chromium trioxide | 192.9 | 193.3 | 198.3 | 197.6 |
| Chromium trichloride | 191.9 | | 188.7 | |
| Known decomposition active blowing assistants: | | | | |
| Zinc oxide | 184.4 | | 182.7 | 180.3 |
| Calcium stearate | 199.8 | | 176.9 | |
| Lead stearate | 195.4 | 196.1 | 167.1 | |
| Potassium permanganate | 197.5 | 198.4 | 172.4 | |
| Potassium pyrophosphate | 198.7 | 199.6 | 175.3 | |
| Sodium thiophosphate | 199.4 | | | |
| Sodium sulfite | 200.1 | | 134.7 | |
| Aluminium alum | 195.1 | 196.2 | 158.2 | |
| Chromium sulfate | 198.3 | | 178.7 | |
| Potassium sulfate | 198.5 | 198.2 | 173.8 | |
| Calcium carbonate | 198.6 | | 169.1 | |

EXAMPLE 2

Figure 2:
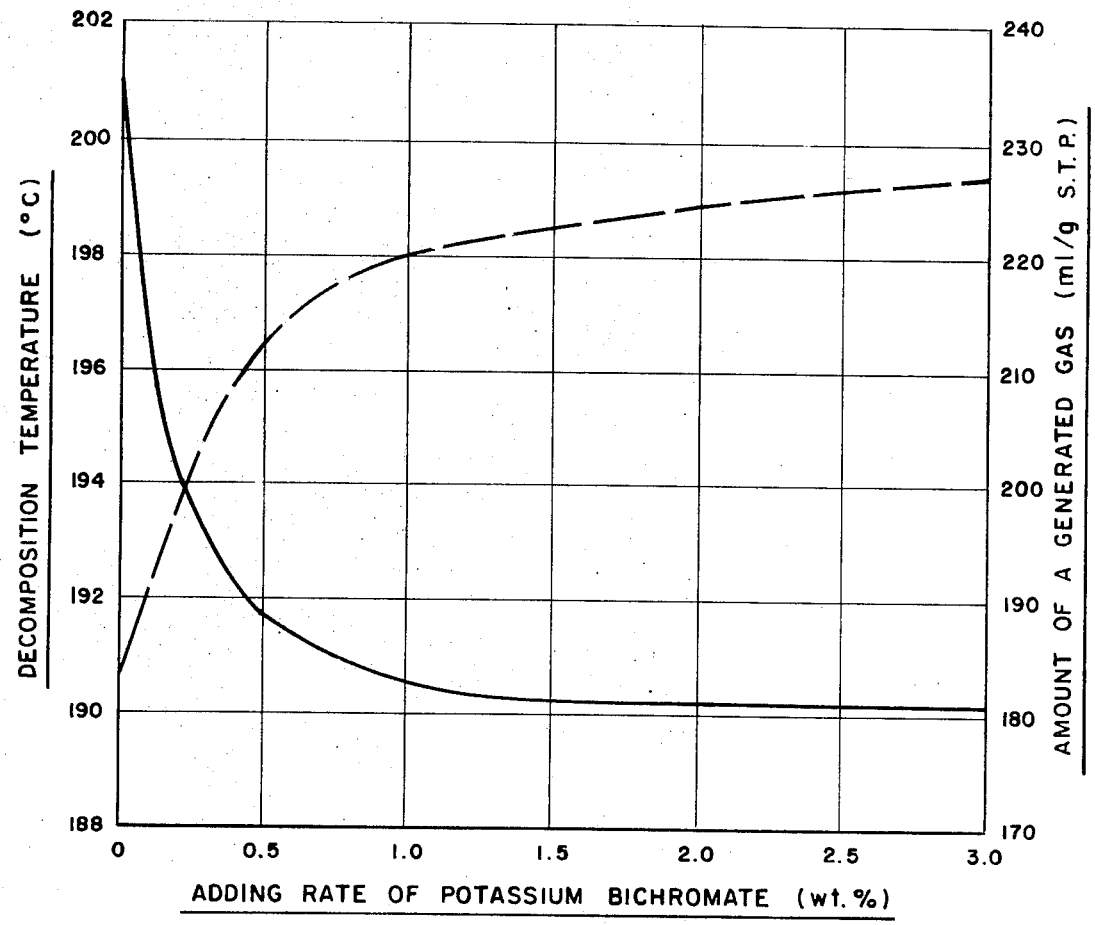
FIG. 2 is a graphic illustration showing the effect on the decomposition temperature (broken line) and amount of gas generated (solid line) on decomposition of azodicarbonamide obtained by varying the amount of potassium bichromate.

To determine the range of effectiveness of the chromium containing compounds potassium-chromium alum ($K_2SO_4Cr_4(SO_4)_3 24H_2O$) and potassium bichromate were added at various levels to azodicarbonamide and the compositions thus obtained were evaluated as described in Example 1. The results are shown in FIG. 1 and FIG. 2. It is apparent from FIGS. 1 and 2 an amount up to about 1% by weight of the chromium containing compound substantially lowers the decomposition temperature and increases the amount of gas generated.

EXAMPLE 3

Mixtures were prepared in which a combination of two of chromium containing compounds were added to azodicarbonamide. The resulting mixtures were tested as described as in Example 1. The results were shown in Table 2.

TABLE 2.—EFFECTS OF ADDING A COMBINATION OF CHROMIUM CONTAINING COMPOUNDS TO AZODICARBONAMIDE

| Additive, weight percent | Decomposition, temperature, (° C.) | Amount of a generated gas (ml./g. at STP) |
|---|---|---|
| Blank | 201.1 | 177.7 |
| Potassium-chromium alum, 0.2 } Potassium bichromate, 0.3 | 193.2 | 213.2 |
| Potassium-chromium alum, 0.25 } Potassium bichromate, 0.25 | 194.6 | 209.4 |
| Potassium-chromium alum, 0.4 } Potassium bichromate, 0.1 | 195.3 | 203.1 |
| Potassium-chromium alum, 0.25 } Potassium chromate, 0.25 | 194.5 | 203.5 |
| Potassium-chromium alum, 0.25 } Chromium trioxide, 0.25 | 194.4 | 202.0 |
| Potassium bichromate, 0.25 } Potassium chromate, 0.25 | 192.4 | 210.8 |

Satisfactory results were obtained in each case, wherein two of the assistants of the present invention were used in combination.

EXAMPLE 4

In order to determine if the decomposition assistant of the chromium series of the present invention have a unique effect on azodicarbonamide or if the chromium containing compounds would be useful with other blowing agents, the effect of potassium bichromate on azoisobutylonitrile, hydrazodicarbonamide, dinitrosopentamethylene tetramine, paratoluenesulfonyl hydrazide and P,P'-oxybis (benzenesulfonylhydrazide) was evaluated.

Potassium bichromate was pulverized in a mortar and 0.5% by weight was added to each of the above blowing agents. The decomposition temperatures were measured by the same method as described in Example 1. The results were shown in Table 3.

TABLE 3.—ADDING EFFECTS OF POTASSIUM BICHROMATE TO VARIOUS KINDS OF BLOWING AGENTS

| Blowing agent | Decomposition temperature (° C.) | |
| --- | --- | --- |
| | Blank | Adding 0.5 wt. percent |
| Azoisobutylonitrile | 99.7 / 99.7 | 99.0 / 98.8 |
| Hydrazodicarbonamide | 246.9 / 247.9 | 248.2 / 248.2 |
| Dinitrosopentamethylene tetramine | 195.6 / 197.1 | 197.1 / 197.6 |
| Paratoluenesulfonylhydrazide | 107.7 / 108.2 | 108.2 / 108.7 |
| P,P'-oxybis (benzenesulfonylhydrazide) | 149.1 / 149.0 | 194.4 / 141.6 |

With each of the above foaming agents, the decomposition temperature was not significantly altered by potassium bichromate. It is apparent, therefore, that compounds of the chromium series exhibit a specific effect only as to azodicarbonamide.

We claim:

1. A composition of matter for blowing thermoplastic resins consisting essentially of azodicarbonamide and at least one chromium containing compound selected from the group consisting of $M_2SO_4Cr_2(SO_4)_3$, $M_2Cr_2O_7$, $M'Cr_2O_7$, $M_2CrO_4$, $M'CrO_4$, $M_2SO_4Cr_2(SO_4)_3 \cdot 24H_2O$, $CrO_3$ and $CrCl_3$ wherein M represents a manovalent cation and M' represents a divalent cation, said chromium containing compound being present in said composition in an amount sufficient to decrease the decomposition temperature of the azodicarbonamide and to increase the amount of gas produced by the decomposition of the azodicarbonamide.

2. The composition according to claim 1 wherein M is Na, K or $NH_4$.

3. The composition of matter according to claim 1 wherein said chromium containing compound is a member selected from the group consisting of:
   (a) a chromate, dichromate or chromium alum salt of an alkaline metal or ammonium,
   (b) a chromate or dichromate salt of an alkaline earth metal, copper, tin or lead,
   (c) chromium trioxide and
   (d) chromium trichloride.

4. The composition according to claim 1 which contains 0.05 to 10% by weight of said chromium containing compound based on weight of the azodicarbonamide.

5. The composition according to claim 1, wherein said chromium containing compound is potassium chromium alum $[K_2SO_4Cr_2(SO_4)_3 \cdot 24H_2O]$.

6. The composition according to claim 1, wherein said chromium containing compound ammonium chromium alum $[(NH_4)_2SO_4Cr_2(SO_4)_3 \cdot 24H_2O]$.

7. The composition according to claim 1, wherein said chromium containing compound is potassium bichromate.

8. The composition according to claim 1, wherein said chromium containing compound is sodium bichromate.

9. The composition according to claim 1, wherein said chromium containing compound is potassium chromate.

10. The composition consisting essentially of an expandable thermoplastic resin, of a first density, azodicarbonamide and a chromium containing compound selected from the group consisting of $M_2SO_4Cr_2(SO_4)_3$, $M_2Cr_2O_7$, $M'Cr_2O_7$, $M_2CrO_4$, $M'CrO_4$, $M_2SO_4Cr_2(SO_4)_3 \cdot 24H_2O$, $CrO_3$ and $CrCl_3$ wherein M represents a monovalent cation and M' represents a divalent cation; said chromium containing compound being present in said composition in an amount from about 0.05% to about 10% by weight of the azodicarbonamide and said azodicarbonamide being present in said composition in an amount which is effective in causing said thermoplastic resin to expand to a second density which is less than said first density when said azodicarbonamide is decomposed in the presence of said chromium containing compound.

References Cited
UNITED STATES PATENTS

| | | | |
| --- | --- | --- | --- |
| 3,197,423 | 7/1965 | Ackerman | 260—2.5 P |
| 3,321,413 | 5/1967 | Riley et al. | 260—2.5 P |
| 3,394,090 | 7/1968 | Hayer | 260—2.5 P |
| 3,476,532 | 11/1969 | Hartman | 260—2.5 E |

SAMUEL H. BLECH, Primary Examiner

W. J. BRIGGS, Sr., Assistant Examiner

U.S. Cl. X.R.

252—67, 188.3; 260—2.5 HA